Figure 1:
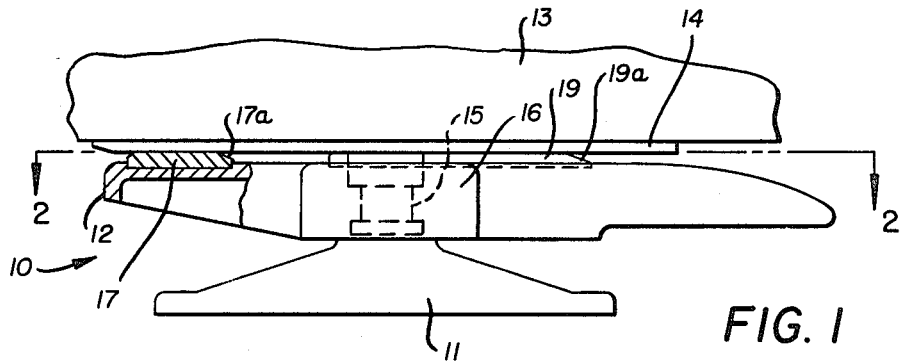

March 23, 1965     M. WIDMER     3,174,812
FIFTH WHEEL CONSTRUCTION
Filed Feb. 18, 1963

INVENTOR.
MAX WIDMER
BY *Hamilton & Cook*
ATTORNEYS 3,174,812
FIFTH WHEEL CONSTRUCTION
Max Widmer, Beringen, Schaffhausen, Switzerland, assignor to Georg Fischer Aktiengesellschaft, Schaffhausen, Switzerland, a corporation of Switzerland
Filed Feb. 18, 1963, Ser. No. 259,162
1 Claim. (Cl. 308—136)

The present invention relates generally to improvements in tractor-trailer coupler construction. More particularly, the invention relates to improvements in devices for coupling a tractor vehicle to a cargo carrying trailer, commonly referred to in the art as "fifth wheels."

The fifth wheel assembly is suitably mounted on the bed of the tractor and includes a top or coupling plate formed with rearwardly divergent leg portions providing a slot adapted to receive a kingpin carried by the trailer. After insertion, the kingpin is retained in the fifth wheel slot by a suitable locking mechanism. The kingpin is carried by a mounting or support plate suitably located on the trailer frame.

Heretofore, the top plate of the fifth wheel has been fabricated by casting low carbon steel or by die stamping sheet steel, to secure the necessary configuration characteristics. The mounting plate for the kingpin has likewise generally been fabricated of low carbon sheet steel or sheet iron.

During coupling operations and under running conditions, the top plate of the fifth wheel and the mounting plate for the kingpin provide the sole bearing contact between tractor and trailer. Although in theory the load bearing surfaces are relatively large, axial friction during coupling and oscillation and rotation during running are such that uneven wear and unequal deformation of both load bearing surfaces occurs quite quickly.

The normal practice is to provide these sliding bearing faces with grease lubrication. However, even with lubrication there is still wear and deformation. A further objection is the constant replenishment and replacement of the lubricating grease. Still another objection is that the lubrication coating will pick up and retain road dust, gravel, stones or chips, with the result that the coating becomes an abrasive increasing wear and deformation.

Therefore, it is an important object of the present invention to provide an improved tractor-trailer coupler of the fifth wheel type which will function without a grease or lubrication layer.

It is a further object of the invention to provide for a coupler construction wherein the axial forces of coupling, the rotational forces of turning and the oscillating forces of running will not result in undue wear or deformation of the coupler elements.

A further important object of the invention is the provision of an improved tractor-trailor coupler capable of operating without lubrication by virtue of appropriate selection of the material forming the bearing surfaces and by providing suitable constructional measures.

In general, the above objects are achieved by providing slide plates of a solid material at precise and predetermined locations between the coupling plate of the fifth wheel and the mounting plate for the kingpin. This, as well as further objects and advantages of the invention will be apparent in view of the following detailed description and the attached drawing.

Figure 2:
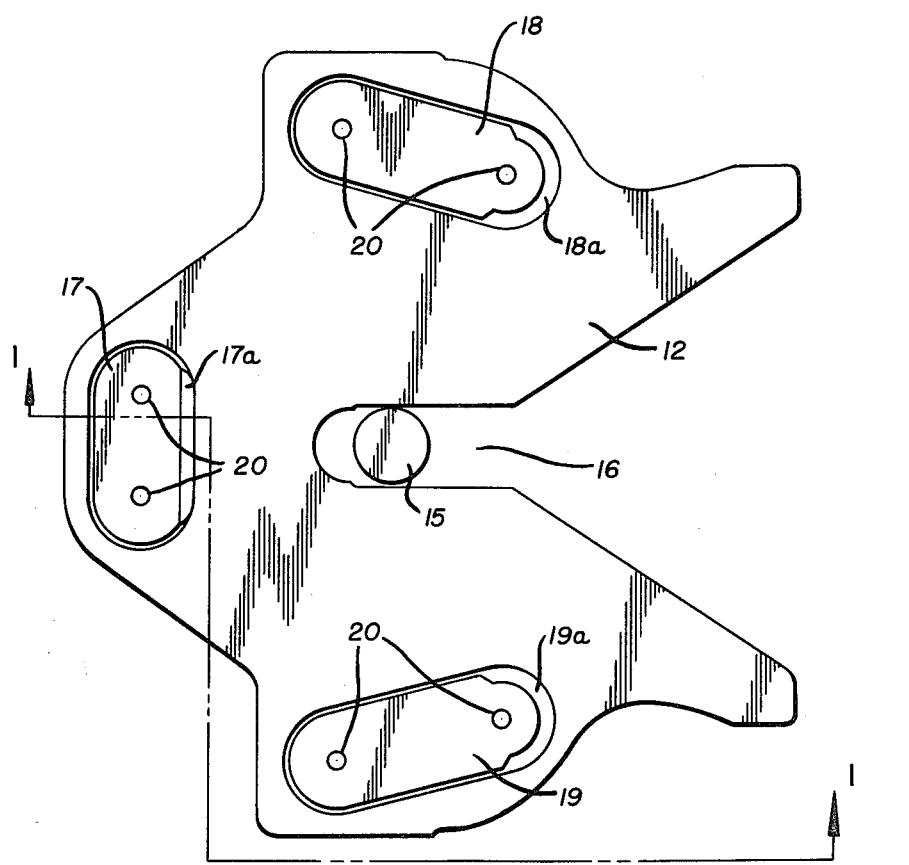

In the drawing:
FIGURE 1 is a fragmentary view in elevation, taken substantially as indicated on line 1—1 of FIGURE 2, showing an improved coupler construction according to the invention;

FIGURE 2 is a plan view, taken substantially as indicated on line 2—2 of FIGURE 1, showing the improved coupling or top plate of the fifth wheel assembly.

Referring to the drawing, the fifth wheel assembly indicated generally by the numeral 10 includes supporting brackets 11 securely attached to the tractor vehicle bed (not shown). The top or coupling plate 12 is mounted on the brackets 11, for backward and forward rocking or oscillatory movement, as by rubber cushions (not shown). Alternatively, the under surface of the coupling plate 12 could have depending bosses (not shown) pivotally connected to the supporting brackets 11. The frame of the trailer is indicated at 13 and the kingpin mounting or support plate 14 is securely attached thereto. The mounting plate 14 carries the depending kingpin or trunnion 15 which may be inserted within the slot 16 of the coupling plate 12 and retained by a suitable locking mechanism (not shown). Generally, such locking mechanism is constructed of fork members and conical rods.

In the preferred form of the invention shown, the slide plates comprise three individual segments 17, 18 and 19, located in correspondingly shaped recesses 17a, 18a and 19a, formed in the coupling plate 12 so as to provide bearing surfaces between the coupling plate 12 and the mounting plate 14. Each slide plate segment is of solid material, having properties described below, and is detachably secured within the appropriate recesses as by the fastening means indicated at 20. The plate 17 is located ahead· of the slot 16 to provide the forward point of bearing contact. The similar plates 18 and 19 are preferably located laterally and symmetrically of the slot 15, preferably being rearwardly and convergingly directed, as shown, to provide optimum bearing contact during turning movements of the tractor and trailer. Thus, in the illustrated embodiment, there is provided a positive three-point support between the coupling plate 12 and the mounting plate 14.

The replaceable slide plates may be fabricated of various solid materials which are wear-resistant or wear-reducing. An inexpensive material is low carbon cast iron. Very good results may be obtained using bearing metals and sintered metals or materials with lubricants alloyed therein; for example, mixtures of bronze, lead, graphite or molybdemum disulfide ($MoS_2$) may be used to advantage.

Advantageous results have further been achieved by employing slide plates formed of plastic or synthetic resin, preferably polyamide resins or acetal resins. Examples of polyamide resins suitable for the purpose of the present invention are nylon 6 (polycaprolactam) e.g. "Zytel 211, Grilon, Nylenka, Catalin, Perlon," nylon 6/6 (polyhexamethylene-adipamide) e.g. "Zytel 42," and nylon 6/10 (polyhexamethylene-sebacamide) e.g. "Zytel 31, Ultramid 6/10." Examples of acetal resins suitable for the purpose of the present invention are acetal (polyoxymethylene) e.g. "Delrin," and acetal copolymer (trioxane) e.g. "Celcon, Hostaform."

It has been found that best results are achieved with solid reinforced or laminate synthetic materials. For example, resin impregnated materials having imbedded textile fibers, asbestos fiber or glass fibers as reinforcements, with additions of lubricants such as graphite or molybdinum disulfide are excellent. It is also of advantage to have the load contact area surface hardened. Thus, the material "Formica" comprising urea- and phenol formaldehyde resins absorbed in a fibrous mass to form a wood-like veneer when cured at elevated temperature under pressure, is very satisfactory.

As an alternative form of utilization, the solid slide plate material, as described above, could be formed in a substantially circular form and attached with the load contact surface directed downwardly, coaxially of the kingpin 15 and attached to the mounting plate 14. Or, a large plate of the solid material could be attached to the coupling 12, with provision being made to conform to the shape of the kingpin slot 16. These forms are to be preferred only when the principles of the invention are to be applied to existing couplers, which do not have a top plate with locating and positioning recesses (17a, etc.).

Further materials and constructional forms are, of course, readily possible without departing from the spirit and scope of the invention, which contemplates installation of at least one solid slide plate serving as a slide and lubrication layer between the coupling plate and the mounting plate. An important advantage of the invention resides in the reduction of the wear of two relatively expensive constructional elements. With a coupling construction according to the invention every sort of maintenance can be dispensed with, which naturally results in considerable saving to the vehicle owner and provides for considerable simplification in operation. It should be appreciated that the segmental slide plates can also be detachably supported in suitable recesses provided in the mounting plate.

What is claimed is:

In a tractor-trailer coupler of the fifth wheel type, a fifth wheel top plate with rearwardly divergent leg portions defining a longitudinal slot for receiving a trailer kingpin, at least three upwardly directed recesses in said top plate, one of said recesses lying transversely of the longitudinal axis through said slot and spaced ahead of said slot, the other two of said recesses lying laterally outwardly of said slot and symmetrical with respect thereto, at least three slide plates detachably fastened, one in each of said three recesses, said slide plates being of wear reducing, solid material and supported in said recesses so that said slide plates project above the surface of said top plate.

References Cited in the file of this patent
UNITED STATES PATENTS

| | | |
|---|---|---|
| 227,792 | King | May 18, 1880 |
| 266,819 | Heath | Oct. 31, 1882 |
| 370,718 | Whitney | Sept. 27, 1887 |
| 1,094,185 | Adams | Apr. 21, 1914 |
| 2,219,415 | Fontaine | Oct. 29, 1940 |
| 2,378,343 | Walter | June 12, 1945 |
| 2,811,374 | Fuschi | Oct. 29, 1957 |